United States Patent
Brodie et al.

(10) Patent No.: US 9,420,155 B2
(45) Date of Patent: Aug. 16, 2016

(54) COMPACT OPTIC DESIGN FOR DIGITAL IMAGE CAPTURE DEVICES

(75) Inventors: Douglas S. Brodie, Los Gatos, CA (US); Miodrag Scepanovic, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 52 days.

(21) Appl. No.: 13/614,677

(22) Filed: Sep. 13, 2012

(65) Prior Publication Data

US 2014/0071327 A1   Mar. 13, 2014

(51) Int. Cl.
| | | |
|---|---|---|
| *H04N 5/225* | (2006.01) | |
| *G03B 17/02* | (2006.01) | |
| *G02B 7/08* | (2006.01) | |
| *G03B 17/12* | (2006.01) | |

(52) U.S. Cl.
CPC ............... *H04N 5/2257* (2013.01); *G02B 7/08* (2013.01); *G03B 17/02* (2013.01); *G03B 17/12* (2013.01); *H04N 5/2254* (2013.01)

(58) Field of Classification Search
CPC .................................. G02B 7/08; G03B 17/02
USPC ........................................................ 348/373
See application file for complete search history.

(56) References Cited

U.S. PATENT DOCUMENTS

| | | | |
|---|---|---|---|
| 5,699,200 A | 12/1997 | Uno | |
| 7,114,862 B2* | 10/2006 | Huang | 396/452 |
| 7,613,389 B2* | 11/2009 | Suzuki et al. | 396/89 |
| 2005/0179803 A1* | 8/2005 | Sawai | 348/335 |
| 2006/0029385 A1* | 2/2006 | Huang | 396/452 |
| 2007/0177279 A1* | 8/2007 | Cho et al. | 359/692 |
| 2008/0203508 A1 | 8/2008 | Cho | |
| 2008/0266674 A1 | 10/2008 | Huang | |
| 2010/0033835 A1* | 2/2010 | Heim et al. | 359/683 |
| 2010/0177238 A1* | 7/2010 | Saito | 348/374 |
| 2012/0057068 A1* | 3/2012 | Ichikawa et al. | 348/345 |
| 2013/0258455 A1* | 10/2013 | Pei | 359/355 |
| 2014/0104479 A1* | 4/2014 | Samuels et al. | 348/335 |
| 2014/0132818 A1* | 5/2014 | Meierling | 348/335 |

OTHER PUBLICATIONS

International Search Report received in PCT Application No. PCT/US2013/054665, dated Nov. 27, 2013.

* cited by examiner

*Primary Examiner* — James Hannett
(74) *Attorney, Agent, or Firm* — Blank Rome LLP

(57) ABSTRACT

A compact optic design is disclosed in which an image capture device's cover glass (or other transparent material) is imbued with optic power and affixed directly to the device's housing. A lens barrel, in which one or more additional lens elements are mounted, may be aligned with the optical lens formed by the cover glass and an image sensor to provide a complete camera module.

16 Claims, 6 Drawing Sheets

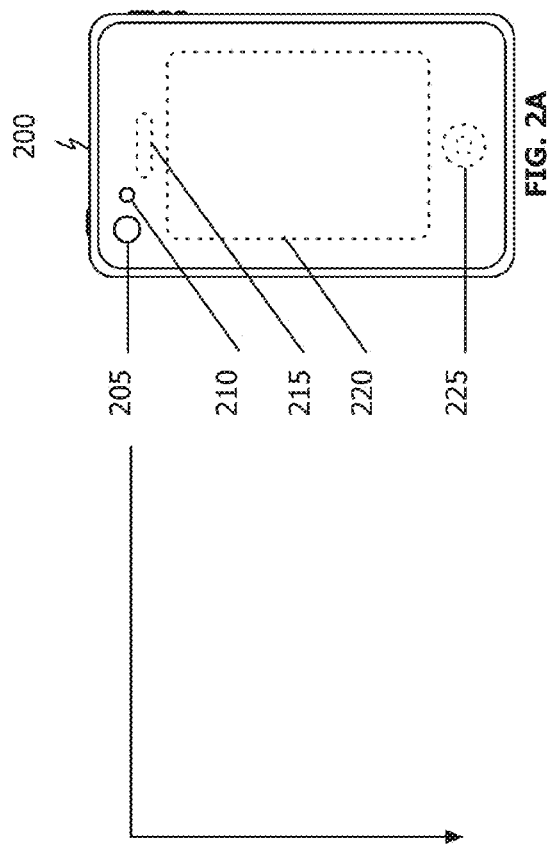
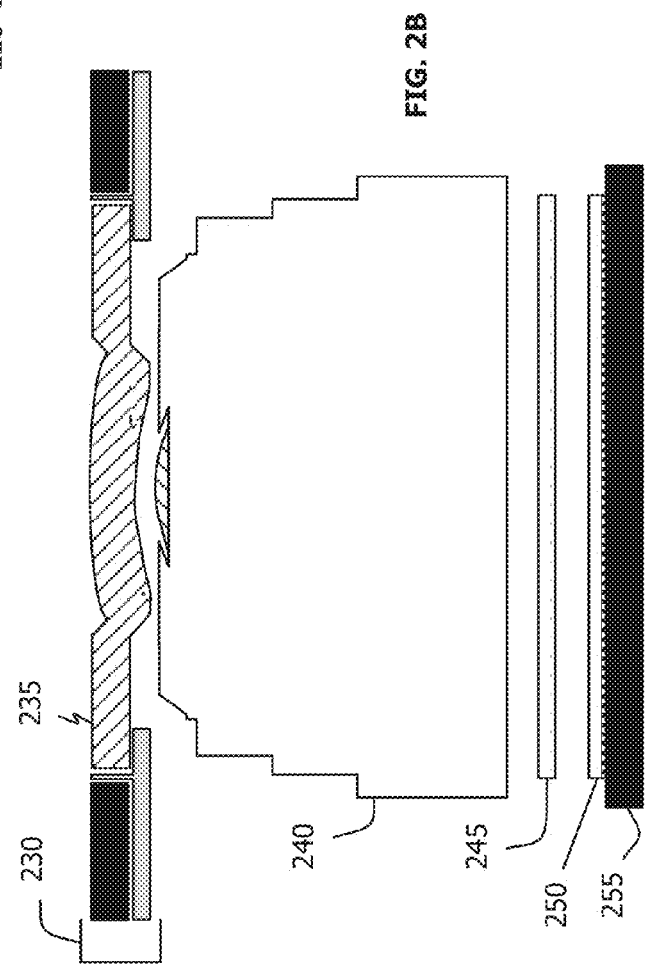

FIG. 5. ILLUSTRATIVE OPTO/MECHANICAL PROPERTIES FOR A 5-LENS CAMERA MODULE

| | L1 305 | L2 315 | L3 320 | L4 325 | L5 330 |
|---|---|---|---|---|---|
| MATERIAL | GLASS | GLASS OR PLASTIC | PLASTIC | PLASTIC | PLASTIC |
| SURFACE SHAPE | SPHERICAL SINGLET OR DOUBLET | ASPHERICAL | ASPHERICAL | ASPHERICAL | ASPHERICAL |
| CENTER THICKNESS/ CLEAR APERTURE DIAM. (MM) | > 0.20 | > 0.30 | > 0.14 | > 0.25 | > 0.15 |
| EDGE THICKNESS (MM) | > 0.35 | > 0.25 | > 0.40 | > 0.25 | > 0.60 |
| DECENTER SENSITIVITY (MICRONS) | ± 10 | ± 2 | ± 2 | ± 2 | ± 5 |

COMPACT OPTIC DESIGN FOR DIGITAL IMAGE CAPTURE DEVICES

BACKGROUND

This disclosure relates generally to the field of optics. More particularly, this disclosure relates to a novel and highly beneficial techniques for fashioning an optical stack or camera module.

Camera modules for mobile telephone and other small form-factor electronic devices are one of the key components in controlling device thickness. Referring to FIG. 1, a prior art mobile telephone handset's rear-facing camera module 100 is typically mounted between the unit's back-plate 105 (including surface-flush cover glass 110) and front cover 115; using the maximum space within the device's housing, thereby controlling the device's overall thickness. Camera module 100 also includes front or first lens 120 and, typically, one or more additional lenses (not shown) housed within lens barrel 125. Lens barrel 125, in turn, is moved toward and away from cover glass 110 by actuator mechanism 130 so as to focus incoming light through infrared cutoff filter (IRCF) 135 and onto the surface of sensor array 140. In practice, cover glass 110 is spaced at a sufficient distance from lens barrel 125 (i.e., the top of lens 120) such that when barrel 125 travels from its infinity position (furthest from glass plate 110) to its macro position (closest to glass plate 110) there is no contact between the two surfaces.

Thickness 145 of camera module 100 is controlled by several factors, a primary consideration among which is the module's overall optical track 150, defined as the distance from the camera's optical sensor surface 140 to the outer surface or top of its first lens element 120. This latter distance is fixed by the limits of Maxwell's equations (for a given sensor and pixel size). It would be beneficial to provide a means to reduce the overall camera height or thickness 145 so as to permit the design of thinner products, resulting in lower mass and improved product aesthetics.

SUMMARY

In one embodiment the inventive concept provides a compact optic design for use in electronic devices. The disclosed design permits the design and manufacture of digital image capture devices that are thinner and/or lighter than comparable prior art devices. One particular embodiment provides an image capture system that includes a first lens member fixed to and flush with an external surface of an electronic device (e.g., a mobile telephone, a personal music player, a personal digital assistant, and various forms of computer systems including desktop, laptop and tablet computer systems). A lens assembly that includes or more additional lens elements (each of which are in fixed relationship to one another) is axially aligned with, and in a movable relationship to, the first lens element. In one embodiment, the lens assembly may be a lens or lens barrel. A light sensor may then be positioned so that light passing through the axially aligned lenses (i.e., the first lens and the one or more additional lens elements mounted in the lens assembly) is focused on light collecting sites of the sensor. Illustrative light sensors include, but are not limited to, charge-coupled device (3D) and complementary metal-oxide-semiconductor (CMOS) active pixel sensors.

In another embodiment, an infrared cutoff filter (IRCF) element may be positioned between the bottom of the lens assembly (i.e., the side away from the first lens element) and the light sensor. In still another embodiment, an aperture stop may be fixed to a surface of a lens in the lens assembly that is closest to the first lens element. In yet another embodiment, a mechanical stop may be added to a surface of the lens assembly and/or the backside of the device's external surface (i.e., the same surface to which the first lens is flush). The mechanical stop providing a mechanism to prevent any lens in the lens assembly from physically contacting the first lens.

BRIEF DESCRIPTION OF THE DRAWINGS

FIGS. 2A and 2B show, in block diagram form, a camera module in accordance with one embodiment.

FIG. 5 presents illustrative opto/mechanical properties for a multi-lens optical system such as that shown in FIG. 3.

DETAILED DESCRIPTION

Figure 1:
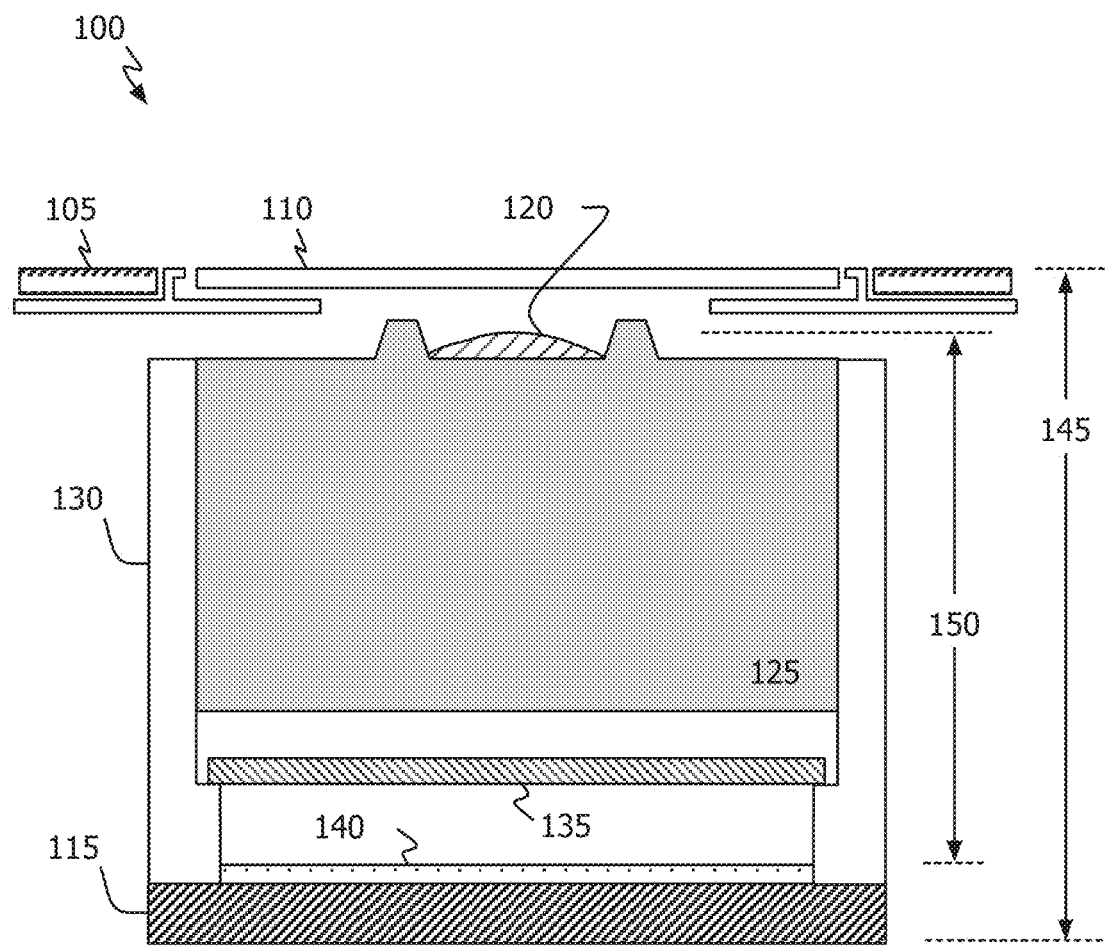
FIG. 1 shows, in block diagram form, a prior art camera assembly.

This disclosure pertains to systems and methods to reduce the height, size or thickness of an image capture device. In general, techniques are disclosed for fashioning a camera module that is more compact than that available in the prior art. More particularly, an compact optic design is disclosed wherein a device's cover glass (or other transparent material) is imbued with optic power and affixed directly to the device's housing. A lens barrel, in which one or more additional lens elements can be mounted, may be optically aligned with the lens/cover glass and an image sensor to provide a complete camera module. As used herein, a "lens" is an optical element that has a finite focal length. At present, the disclosed embodiments can provide a 10%-15% reduction in the camera module's overall height and system thickness in comparison to conventional designs having similar optic capabilities (e.g., number of lens elements).

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of camera or optic systems having the benefit of this disclosure. Further, the application in which the disclosed embodiments are described is a mobile telephone. No such limitation is inherent in the described technology. By way of example only, a camera module in accordance with this disclosure could also be implemented in any small form-factor digital device incorporating image capture capability. By way of example, stand-alone digital cameras, portable music players, personal digital assistants, laptop/notebook computer systems, and tablet computer systems.

Referring to FIG. 2A, rear-facing mobile telephone 200 is shown having camera module 205 and flash unit 210. Front facing elements such as speaker 215, view screen 220 and control button 225 are shown as dotted lines. Various other controls are shown as raised black regions spaced about the device's periphery (e.g., power and volume controls). An integrated optic design that includes camera module 205 is shown in cross-section in FIG. 2B. As with prior art camera units, camera module 205 may be juxtaposed or sandwiched between device 200's back-plate 230 and front face 255. Unlike the prior art, camera module 205 employs lens 235 coincident with the device's back-plate 230. By coincident, it is meant that a lens surface (see discussion below) is substantially flush with a device's external surface. In one embodiment, a lens element 235 may be affixed directly to the back-plate or device housing. Also shown in FIG. 2B is lens barrel 240 (minus an actuator mechanism such as that shown in FIG. 1, 130), IRCF 245, optical sensor 250, front plate 255 and the top-most portion of a lens mounted in lens barrel 245.

Figure 3:
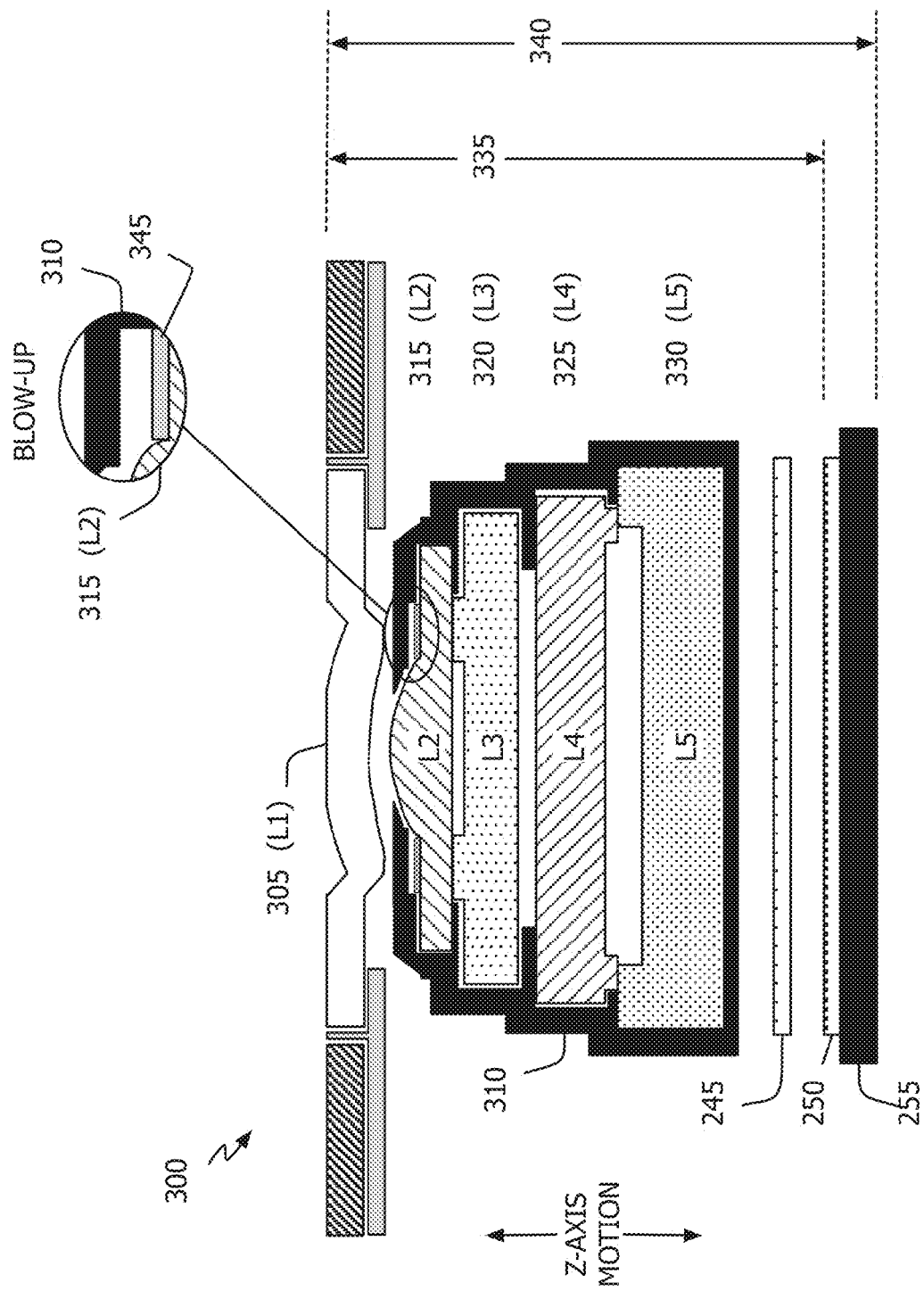
FIG. 3 shows, in block diagram form, a camera module in accordance with a second embodiment.

Referring to FIG. 3, camera module 300 in accordance with one embodiment includes lens 1 (L1) 305 affixed to or made part of the device's back-plate 230. Illustrative camera module 300 employs lens barrel 310 to house an additional four lens: lens 2 (L2) 315, lens 3 (L3) 320, lens 4 (L4) 325, and lens 5 (L5) 330. As in FIG. 2, a complete system would also include IRCF 245, optical sensor 250 and the device's front plate 255.

Together, lens L1 305 and lens barrel 310 (housing lenses L2 315-L5 330) form a 5-lens stack having an overall optical track 335 and device thickness 340. Incorporating lens L1 305 into the device's back-plate in accordance with this disclosure allows the lens barrel to be thinner (it now only has to host four lenses rather than 5 as in a prior art 5-lens camera module). This, in turn, permits the module's overall thickness 340 to be less than that of a prior art 5-lens module. The same may be said for all comparable devices. That is, a device in accordance with FIG. 3 having "n" lens elements will be thinner than a prior art device having "n" lens elements.

Also highlighted in FIG. 3 (see blow-up) is a novel position for aperture stop 345. As shown, aperture stop 345 may be affixed directly to lens element L2 315. In prior art barrel designs the aperture stop is generally molded into the top surface of the lens barrel. In this position, the aperture stop could interfere with the free movement of lens L2 315 to L5 330 as the barrel is moved closer to lens L1 305 (thereby limiting the close-in or macro focus capability of the camera assembly). In one embodiment, aperture stop 345 may be formed from a thin metal plate and affixed directly to the top of lens L2 315 (i.e., on the surface closest to lens L1 305). In another embodiment, aperture stop 345 may be made of any suitably opaque material. In this implementation, lens barrel 310 may only be needed to ensure lens concentricity and provide resistance from axial forces induced during assembly of the lens elements.

Figure 4A:
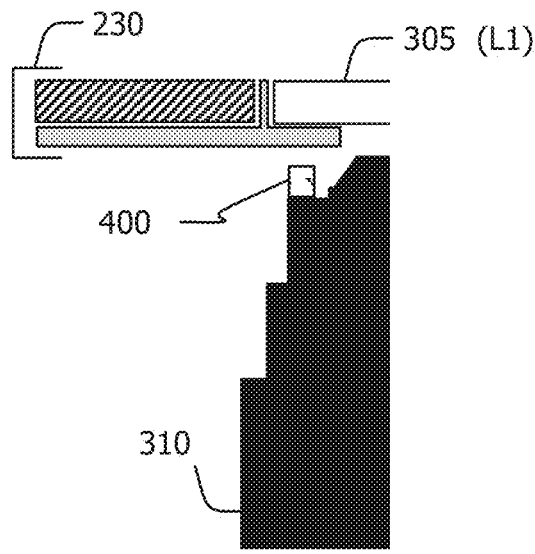
FIGS. 4A and 4B show to approaches to providing a mechanical stop in accordance with this disclosure.
Figure 4B:
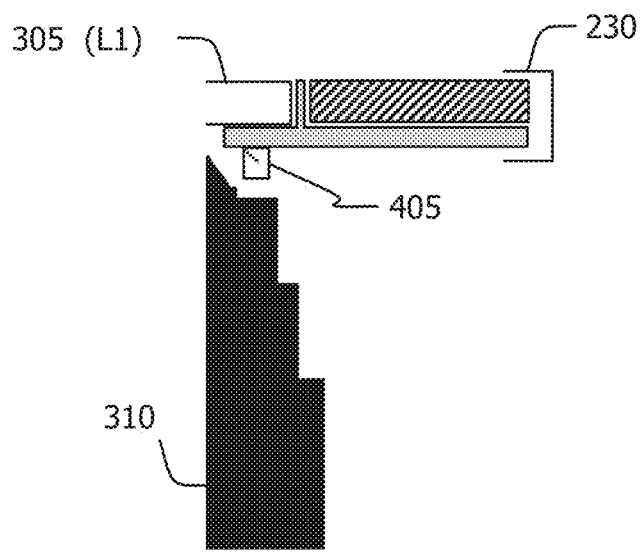

Referring again to FIG. 3, the illustrated embodiment may rely on the physical contact between lens L2 315 and lens L1 305 to limit the movement of lens barrel 310 in one direction along the z-axis. In another embodiment, material may be added to either lens barrel 310 or back-plate 230 to act as a mechanical stop. FIGS. 4A and 4B show two illustrative embodiments using this approach. In FIG. 4A, material 400 may be added to lens barrel 310 so that this material contacts back-plate 230 before lens L2 315 contacts lens L1 305. In FIG. 4B, the same effect is provided by adding material 405 directly to back-plate 230.

Referring to FIG. 3, in one embodiment lens member L1 305 may be fashioned from glass for abrasion resistance and be sufficiently thick so as to provide sufficient mechanical strength for the device's intended use. Lens member L1 305 may also have one or more anti-reflective coatings and, perhaps, one or more additional hard coats to protect the anti-reflective layers (e.g., a diamond-like coating). It may also be valuable to provide lens member L1 305 with limited optical power so that de-centers and axial position variances between lens L1 305 and the lenses mounted in lens barrel 310 due to fabrication processes may yield an acceptable operational device (e.g., in quality and yield). It has been found that when the optic power of lens L1 305 is relatively small, fabrication of the camera module 205 becomes easier. In one embodiment, the ratio of focal length between the first lens (e.g., lens L1 305) and that provided by lens barrel 310 is substantial, e.g., ten-to-one. In other embodiments, this ratio may be less (generally providing a higher quality image at the expense of fabrication difficulty) or more (providing a lower quality camera module). For example, it has been determined that when lens L1 305 is aspherical, the camera device's image quality is better. FIG. 5 provides illustrative opto/mechanical properties for a 5-lens optical system such as that shown in FIG. 3.

In one embodiment, a support structure may be insert-molded with the lens element that is coincident with a device's external surface (e.g., lens L1 305). An advantage of this approach is that a low compliance joint is created ensuring minimal displacement of the lens toward the device's interior (i.e., toward lens L2 315) under external loading. In another embodiment, the first lens element (i.e., lens L1 305) may be affixed into a support structure using pressure-sensitive adhesive or epoxy. In both embodiments, the support structure itself may, for example, be molded plastic or machined alloy.

Because lens member L1 305 is mechanically separated from the lenses mounted in lens barrel 310, it may be beneficial during assembly operations to ensure these lenses are properly aligned. In one embodiment, lens alignment may be achieved using an active alignment process. During active alignment, image sensor 250 is activated and the position of first lens member L1 305 is moved in the x, y and z directions until a suitable position is achieved (e.g., an acceptable position along the lens assemblies "through-focus curve" is found).

Figure 6:
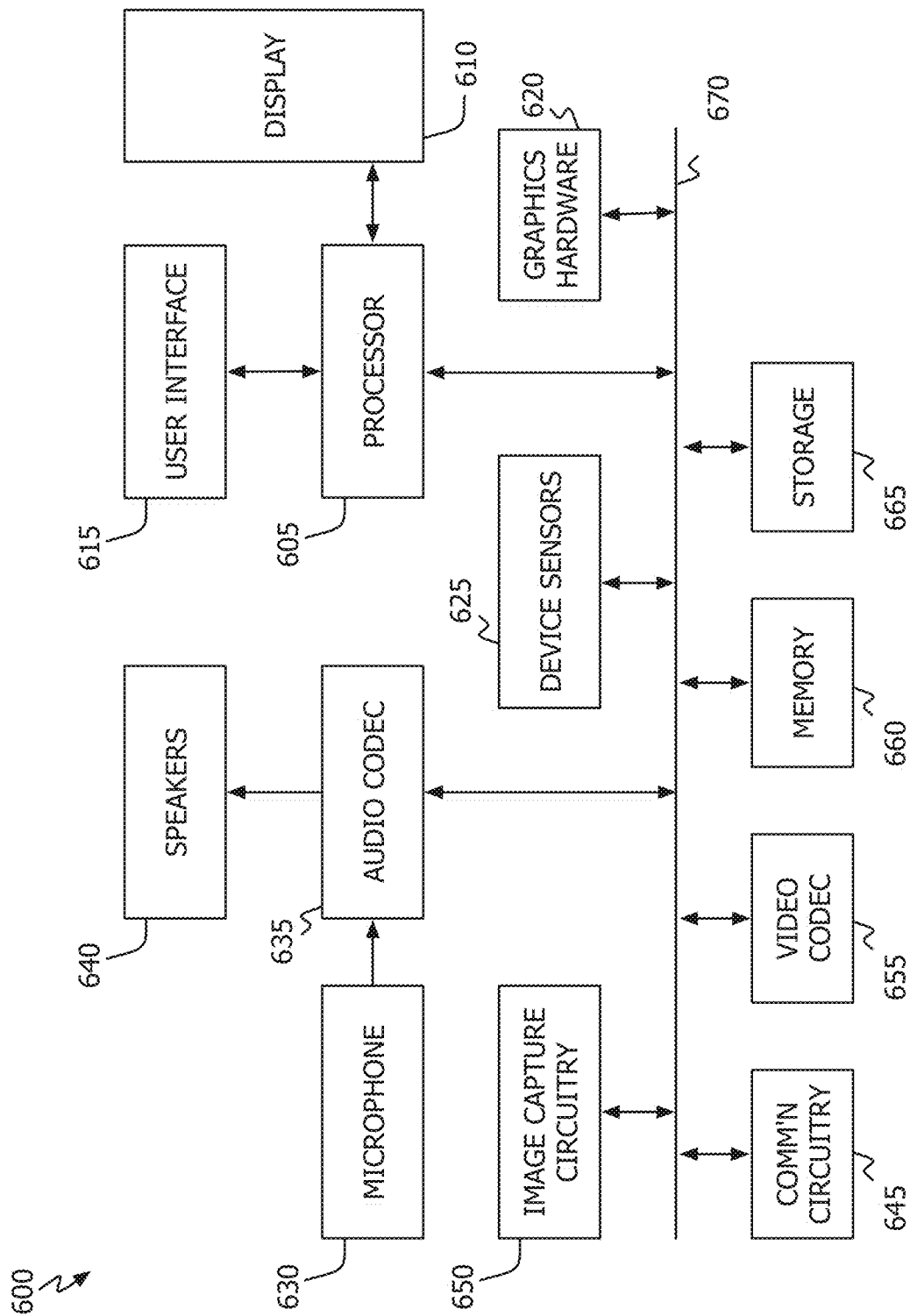
FIG. 6 shows, in block diagram form, an illustrative multi-function electronic device in accordance with one embodiment.

Referring to FIG. 6, a simplified functional block diagram of illustrative electronic device 600 is shown according to one embodiment. Electronic device 600 may be, for example, a mobile telephone, a personal digital assistant, a personal music player or the like. Device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture unit 650 (including a camera module in accordance with this disclosure), video codec(s) 655, memory 660, storage 665, and communications bus 670. Electronic device 600 may be, for example, a personal digital assistant (PDA), personal music player, a mobile telephone, or a notebook, laptop or tablet computer system.

Processor 605 may execute instructions necessary to carry out or control the operation of many functions performed by device 600. Processor 605 may, for instance, drive display 610 and receive user input from user interface 615. User interface 615 can take a variety of forms, such as a button, keypad, dial, a click wheel, keyboard, display screen and/or a touch screen. Processor 605 may be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 process graphics information. In one embodiment, graphics hardware 620 may include a programmable graphics processing unit (GPU).

Sensor and camera circuitry 650 may utilize the compact optic design disclosed herein to capture still and video images. Output from camera circuitry 650 may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605, graphics hardware 620, and image capture circuitry 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). By way of example, camera modules in accordance with this disclosure are not limited to rear-facing camera modules or modules utilizing a 5-lens assembly as illustrated in FIG. 3. In addition, a lens member coincident with a device's external surface (e.g., lens member L1 305 230 and device surface 230) may have more or less curvature (i.e., more or less optic power) and may be spherical or aspherical depending on the designer's specific goals and the ability of her manufacturing and/or assembly processes to produce a properly aligned camera unit. Further, the type of light sensor (e.g., sensor 250) is immaterial to the disclosed techniques. Accordingly, the scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An image capture system, comprising:
a first lens member having an object side surface including a flat region in a same plane as a top surface of an electronic device, wherein the top surface of the electronic device is a flat surface;
one or more additional lens members in fixed relation to each other, in movable relation with the first lens member, and axially aligned to the first lens member, wherein each of the first lens member and the top surface is stationary in relation to each of the one or more additional lens members; and
a sensor having light sensitive elements on a first surface, wherein the first surface of the sensor is substantially orthogonal to the axially aligned first and one or more additional lens members and the top surface of the electronic device, the first surface of the sensor is substantially parallel to the flat region of the first lens member and the top surface of the electronic device.

2. The image capture system of claim 1, wherein the one or more additional lens members are mounted in a lens barrel.

3. The image capture system of claim 2, further comprising an infrared cutoff filter (IRCF) juxtaposed between the lens barrel and the sensor.

4. The image capture system of claim 1, wherein the first lens member has a focal length that is greater than an aggregate focal length of the one or more additional lens members.

5. The image capture system of claim 1, wherein the first lens member does not have an aperture stop coincident with, or coupled to, any surface of the first lens member.

6. The image capture system of claim 5, wherein the aperture stop is fixedly attached to an object side surface of a second lens member, the second lens member being one of the one or more additional lens members.

7. The image capture system of claim 6, wherein the object side surface is closest to, and oriented toward, the first lens member.

8. The image capture system of claim 1, wherein the first lens member comprises a support structure into which the first lens member has been insert-molded.

9. The image capture system of claim 1, further comprising a mechanical element configured to prevent any one of the one or more additional lens members from physically contacting the first lens member.

10. The image capture system of claim 9, wherein the one or more additional lens members are mounted in a lens barrel, the lens barrel having a top surface, the top surface being oriented toward the first lens member, and wherein the mechanical element is affixed to the top surface of the lens barrel.

11. The image capture system of claim 1, comprising one of a mobile telephone, a tablet computer system, a notebook computer system, a personal music player, and a desktop computer system.

12. An image capture system, comprising:
an electronic device having a top surface, wherein the top surface is flat;
a first lens member having a first surface fixedly attached to the top surface of the electronic device, wherein the first surface includes a flat region that is in a plane of the electronic device's top surface;

a second lens member and zero or more additional lens members mounted in a lens assembly, wherein the lens assembly maintains each of the second lens member and the zero or more additional lens members in fixed relation to each other, the lens assembly in movable orthogonal relation with the first lends member and axially aligned to the first lens member, wherein each of the first lens member and the top surface is stationary in relation to the lens assembly;

an aperture stop fixedly attached to an object side surface of the second lens member; and a sensor having light sensitive elements on a third surface, wherein the third surface is oriented toward, substantially orthogonal to, and axially aligned to the first lens member, the second lens member and the zero or more additional lens members, wherein the third surface is parallel to the flat region of the first lens member and the top surface of the electronic device.

13. The image capture system of claim 12, wherein the first lens member has a focal length that is greater than an aggregate focal length of the second lens member and the zero or more additional lens members housed in the lens assembly.

14. The image capture system of claim 12, further comprising a mechanical stop configured to prevent any lens member mounted in the lens assembly from physically contacting the first lens member.

15. The image capture system of claim 14, wherein the mechanical stop comprises a component affixed to, or made part of, the lens assembly.

16. The image capture system of claim 12, comprising one of a mobile telephone, a tablet computer system, a notebook computer system, a personal music player, and a desktop computer system.

* * * * *